*(12)* United States Patent
Clement et al.

(10) Patent No.: US 8,855,311 B1
(45) Date of Patent: Oct. 7, 2014

(54) ADVANCED CONTAINER SECURITY DEVICE NETWORK PROTOCOLS

(75) Inventors: Russel E. Clement, El Cajon, CA (US); Ayax D. Ramirez, Chula Vista, CA (US); Michael R. Reaves, Ramona, CA (US); Sarah M. Lauff, San Diego, CA (US); Joel T. Baumbaugh, San Diego, CA (US); Anton Y. Yen, San Diego, CA (US); Joshua S. Phillips, Chula Vista, CA (US); Stephen L. Childress, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 74 days.

(21) Appl. No.: 13/225,597

(22) Filed: Sep. 6, 2011

Related U.S. Application Data (63) Continuation-in-part of application No. 13/195,916, filed on Aug. 2, 2011.

(51) Int. Cl.
*H04K 1/00* (2006.01)
*H04W 40/24* (2009.01)
*H04W 74/08* (2009.01)

(52) U.S. Cl.
CPC .......... *H04W 40/24* (2013.01); *H04W 74/0808* (2013.01)
USPC .............. 380/270; 370/336; 808/77; 709/223

(58) Field of Classification Search
CPC . H04W 40/24; H04W 74/0808; H04W 84/18; H04W 8/005; G06F 1/3203
See application file for complete search history.

(56) References Cited

U.S. PATENT DOCUMENTS

| 7,165,116 | B2 | 1/2007 | Grove | |
|---|---|---|---|---|
| 7,317,693 | B1 | 1/2008 | Roesch | |
| 2007/0009104 | A1* | 1/2007 | Renkis | 380/270 |
| 2008/0160928 | A1* | 7/2008 | Tsfaty et al. | 455/77 |
| 2008/0244741 | A1 | 10/2008 | Gustafson | |
| 2009/0003226 | A1 | 1/2009 | Wang | |
| 2009/0122721 | A1 | 5/2009 | Ko | |
| 2009/0125957 | A1* | 5/2009 | Singh et al. | 725/111 |
| 2009/0193109 | A1* | 7/2009 | Kuo et al. | 709/223 |
| 2010/0163731 | A1 | 7/2010 | Haran | |
| 2010/0180006 | A1 | 7/2010 | Nourbakhsh | |
| 2010/0189082 | A1* | 7/2010 | Choi et al. | 370/336 |

* cited by examiner

*Primary Examiner* — Nirav B Patel
*Assistant Examiner* — Mohammed Waliullah
(74) *Attorney, Agent, or Firm* — SPAWAR Systems Center Pacific; Kyle Eppele; Stephen E. Baldwin (57) ABSTRACT

In one preferred embodiment, a set of air interface protocols (AIPs) provides a method for secure wireless-to-IP communication between conveyance-mounted security sensors and one or more remote data consolidation centers employing a global ad-hoc network topology, comprising one or more on-conveyance sensing devices; one or more on-conveyance wireless communications devices; one or more wireless-to-IP bridging devices; one or more internet-addressable remote data centers; wherein the remote data center contains computer instructions for: commanding secure AIP-compliant operations; and maintaining a data base of security sensor-related events interfacing to an encryption key management facility.

12 Claims, 6 Drawing Sheets

ADVANCED CONTAINER SECURITY DEVICE NETWORK PROTOCOLS

CROSS-REFERENCE TO RELATED APPLICATIONS

The present application is a Continuation-In-Part (CIP) application of parent patent application Ser. No. 13/195,916, filed Aug. 2, 2011, entitled "Network Access Device for a Cargo Container Security Network" (Navy Case NC 101,017), which is assigned to the same assignee as the present application, and the details of which are hereby incorporated by reference. Priority is claimed herein in accordance with 35 USC §120.

FEDERALLY-SPONSORED RESEARCH AND DEVELOPMENT

This invention (NC 100,704) is assigned to the United States Government and is available for licensing for commercial purposes. Licensing and technical inquiries may be directed to the Office of Research and Technical Applications, Space and Naval Warfare Systems Center, Pacific (SSC Pacific), Code 72120, San Diego, Calif., 92152; voice (619) 553-5118; email ssc_pac_t2@navy.mil

BACKGROUND OF THE INVENTION

In the past, both private industry and government agencies have investigated ways to improve security in the global supply chain in an effort to protect against criminal activity and terrorist attacks. This has included development of improved mechanical and electronic container seal technology, as well the development of sensor systems and inspection agreements/processes to identify and monitor cargo movement at major ports and transit points throughout the world. In anticipation of new U.S. Government policies on enhanced security requirements for all U.S.-bound cargo, various government and industry teams have been investigating ways to adapt existing technologies and processes to provide monitoring of containers from the POS to the PODC. The use of Security Device Systems in the global supply chain is one component of an improved national security posture. The ACSD Network and Security Protocols formalize the requirements for Security Devices consistent with DHS's security needs and operations, while considering the shipping industry's operational needs.

SUMMARY OF THE INVENTION

In one preferred embodiment, a set of air interface protocols (AIPs) provides a method for secure wireless-to-IP communication between conveyance-mounted security sensors and one or more remote data consolidation centers employing a global ad-hoc network topology, comprising one or more on-conveyance sensing devices; one or more on-conveyance wireless communications devices; one or more wireless-to-IP bridging devices; one or more internet-addressable remote data centers; wherein the remote data center contains computer instructions for: commanding secure AIP-compliant operations; and maintaining a data base of security sensor-related events interfacing to an encryption key management facility.

BRIEF DESCRIPTION OF THE DRAWINGS

The invention will be more fully described in connection with the accompanying drawings, where like reference numerals designate like components, in which.

DETAILED DESCRIPTION OF THE PREFERRED EMBODIMENTS

Before going into more detail regarding the network protocols of the present invention, an overview of FIGS. 1 and 2 will first be described.

Figure 1:
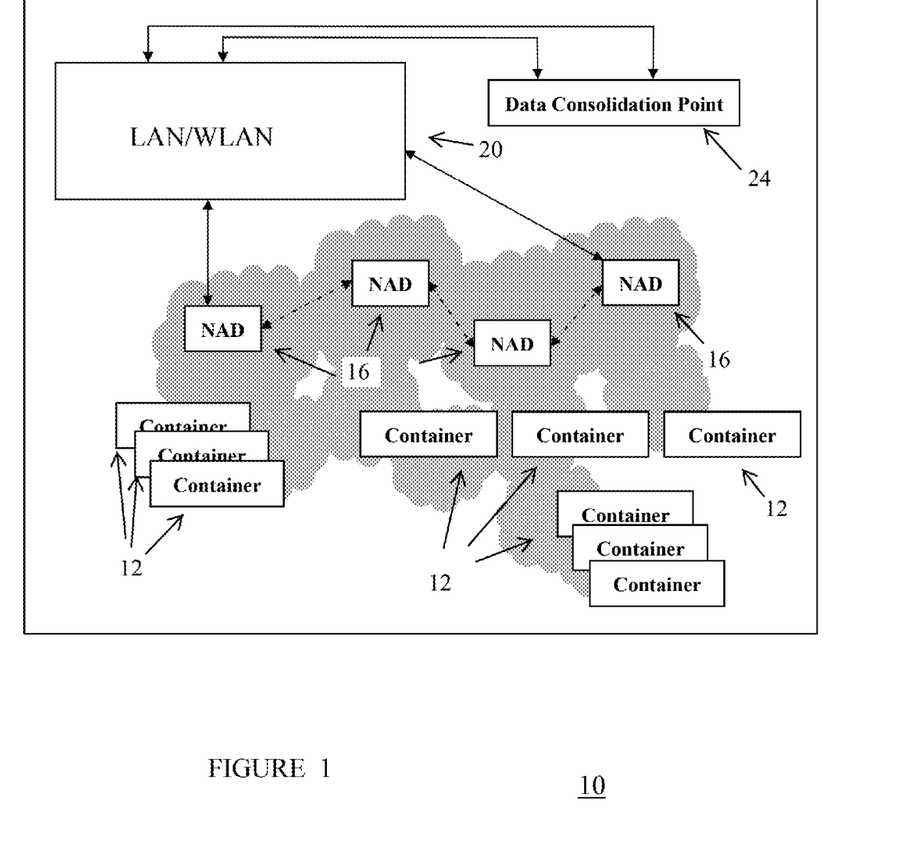
FIG. 1 shows a network topology example of dispersed containers utilizing multiple network access devices (NADs).
Figure 2:
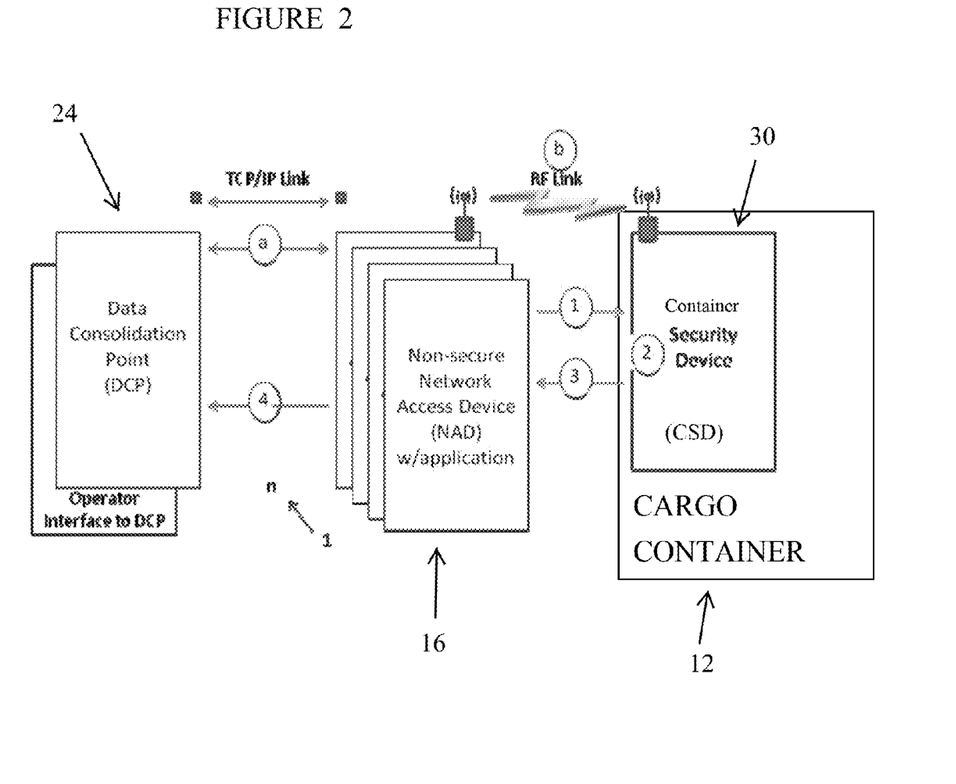
FIG. 2 shows an example of multiple NADs utilized with a container security device.

FIG. 1 shows a network topology example of dispersed containers utilizing multiple network access devices (NADs) and FIG. 2 shows an example of multiple NADs utilized with a container security device, both of which are described in the above cross-referenced parent patent application.

FIG. 1 shows a block diagram of a network topology example 10 with multiple dispersed containers (conveyances) 12, either at gate or in storage. Multiple NADs 16 can communicate with any one of the multiple containers 12 such as shown in FIG. 1. The NADs 16 also communicate with terrestrial or satellite LAN/WLANs 20 with connectivity to a DCP (Data Consolidation Point) 24, optionally via a local/regional DCP/gateway. Encrypted secure messages are forwarded verbatim to the host nation's security center, and vice-versa. DCPs 24 may interoperate to collaborate.

The Non-secure Network Access Device (NAD) described herein provides a bidirectional wireless RF communications interface to Security Devices, based upon IEEE Standard 802.15.4-2006 physical and data link layer protocols. The NAD is the link for data and command transmission between Security Devices and the operator or a Data Center (DC). A NAD may be any appropriate mix of hardware, software, and internal interfaces that satisfy the functional requirements and user interface requirements specified for a NAD application.

The NAD implementations supporting Advanced Container Security Device (ACSD)/Container Security Device (CSD)/Electronic Chain of Custody (ECoC) and Marine Asset Device Tracking System (MATTS) Networks range from completely transparent Non-secure NADs to Secure NADs. Non-secure NADs pass messages to and from a DC without modification as part of the un-trusted network. Generally speaking, these are in fixed locations that do not assume the presence of, or access control by, a trusted agent.

NADs implemented as fixed installations (not portable) as part of the un-trusted network are referred to as Fixed NADs (FNADs). FNADs are always mains-powered (i.e., general AC electric power supply). At the other functional extreme are Secure NADs that possess authorizing credentials that allow them to issue restricted commands and access encrypted messages and log files in the same fashion as a Data Center. These devices are intended to always be in the possession and complete control of a trusted agent and as such are most likely to be portable (handheld) NADs (HNADs). HNADs can be either Secure or Non-secure NADs but in all cases are battery powered.

All NADs support the following tasks:
Identify Security Devices in their RF communication range,
Establish a wireless network connection with the Security Devices,
Deliver Security Device Commands to the Security Device,
Acquire Security Device Status Messages and Security Device Event Logs, and
Communicate Security Device Status Messages and Security Device Event Logs to the assigned DCP.

FIG. 2 shows the communication links between the CSD 30, multiple Non-secure NADs 16 (i.e., NADs 1-n), and DCP 24, and more particularly the communications links for status message steps where the security device is a CSD (Container Security Device) 30.

The CSD 30 monitors the integrity of a cargo container 12 from the point-of-consolidation to the point-of deconsolidation, such as in a maritime supply chain. Typically, the CSD 30 is attached to the inside of a cargo container 12 to monitor all six interior sides and report any intrusion or door opening or the presence of human cargo. If the CSD 30 detects an intrusion, breach, door opening, human, or the like, the CSD 30 transmits alarm information via the RF link shown in FIG. 2.

In order for the Non-secure Network Access Device 16 to transmit and receive data, it must first establish connectivity with the Data Consolidation Point 24 via a TCP/IP link while providing wireless coverage of one or more Security Devices 30 via an 802.15.4 RF link. Once these connections are complete, encrypted messages can be sent between the DCP 24 and the Security Device 30. The order of messages sent for all types of Security Device messaging are described below.

During pre-operations, at step a in FIG. 2, the NAD 16 communications with the DCP (Data Consolidation Point) 24 are enabled via the TCP/IP link. At step b, the CSD 30 enters coverage of one or more NADS 16 via the RF link.

For unsolicited status message exchange steps, at step 1 in FIG. 2, the NAD 16 transmits a network access device announcement (NADA) message to the CSD 30 via the RF link. At step 2, the CSD 30 validates the NADA message and selects a NAD 16 from the multiple NADs (i.e. NADs 1-n shown in FIG. 2) for a message exchange based on signal quality. At step 3, the CSD 30 sends the CSD Status Message to the selected NAD 16 via the RF link. At step 4, the selected NAD 16 forwards the CSD Status Message to the DCP 24 via the RF link.

The Advanced Container Security Device (ACSD) Network and Security Protocols described herein provide system and component technical requirements for Department of Homeland Security (DHS) Advanced Container Security Device (ACSD) System. This system is inclusive of the Container Security Device (CSD), Marine Asset Tag Tracking System (MATTS) as well as the Electronic Chain of Custody (ECoC) concept. DHS is currently conducting an integrated research, development, test, and evaluation program to develop secure supply chains through implementation of the ACSD technologies. This effort includes future data and communications architecture, portal inspection systems, advanced trade data collection, advanced targeting systems, cargo tracking and tagging systems, Container Security Devices (CSDs) and Advanced Container Security Devices (ACSDs).

The primary purpose of the ACSD System is to monitor the five sides and doors of an ISO 668 Dry Shipping Container for intrusion while in transit, supporting container shipping from the Point of Stuffing (POS), through a Container Security Initiative (CSI) port, US ports and through the Point of Deconsolidation (PODC) within the United States. The primary emphasis is on assuring the physical security of the container, specifically directed at the detection of unauthorized opening, closing, or removal of the container doors, penetration of any of the six sides, and human presence. Of supplementary importance are detection of the container location, and the recording of container interactions. The security device must survive the rigors of intermodal transport, especially the marine environment.

The functional goal of the ACSD Network and Security Protocols (the object of this patent disclosure) is to provide requirements and open standards for on-container security devices and wireless communications network that will enable commercial competition and interoperability for global container security. From here forward, unless otherwise noted, the term "Security Device" will be used and understood to mean an ACSD or CSD device, and the term "Security Device System" will be used and understood to mean the network that supports the ACSD or CSD Systems. For all implementations, the wireless communications network includes both handheld and fixed Network Access Devices (NADs) and IP-based data management systems.

Optional program elements, including Electronic Chain of Custody (ECoC) Devices and external tags that provide GPS functions and network extension. A communications module for purposes of this test plan may refer to either an External Communications Module (ECM) mounted on the outside of a cargo conveyance or an Embedded Communications Module (CM), which may be integral to any of the following:
Advanced Container Security Device (ACSD),
Container Security Device (CSD),
Handheld Network Access Device (HNAD),
Fixed Network Access Device (FNAD),
Electronic Chain of Custody Device (ECoC),
Wireless Key Implement
Internal Container Add-on Sensor (AoS).

The ACSD Network is required to provide secure wireless communications among all such devices using AES-128 encryption and support IP connection to a remote or local Data Center (DC). The primary communications mode is required to be 2.4 GHz radio frequency (RF—IEEE 802.15.4). Cellular and satellite connections may be used as secondary communications modes. The ECM and ECoC Device must also include GPS location and tracking.

Devices

The ACSD Network that the subject protocols support is inclusive of no less than five different devices: Security Device (such as an ACSD or CSD), Network Access Device (NAD)(Fixed and Handheld), Data Center (DC), Marine Asset Tag Tracking System Device (MATTS) and an Electronic Chain of Custody Device (ECoC). These devices incorporate the subject protocols but are not intended to be covered by this patent disclosure. Their descriptions are as follows:

Security Device

A Security Device is a component of the Security Device System that monitors the status of both of the Container doors (in the case of the CSD), and the walls and floor (in the case of an ACSD), and creates an Event Log of all relevant events. The design of the Security Device must consider door conditions and motions, other than simple opening, closing, or door removal, that are likely to occur in the shipping environment. Examples include racking of the container, cargo motion within the container, and potential interactions with other cargo containers (such as container stacking which routinely occurs in ports and on board cargo ships).

Network Access Devices (NADs)

NADs provide a bidirectional wireless RF communications interface to Security Devices, based upon IEEE Standard 802.15.4-2006 physical and data link layer protocols. (The protocols covered by this disclosure rest on top of these standardized layers.) The NAD is the link for data and command transmission between Security Devices and the operator or DC. A NAD may be any appropriate mix of hardware, software, and internal interfaces that satisfy the functional requirements and user interface requirements specified for a NAD Application. The NAD implementations supporting ACSD/CSD/ECoC and MATTS Networks range from completely transparent NADs that pass messages to and from a DC without modification as part of the un-trusted network.

Generally speaking, these are in fixed locations that do not assume the presence of, or access control by, a trusted agent. NADs implemented as fixed installations (not portable) as part of the un-trusted network are referred to as Fixed NADs (FNADs). At the other functional extreme are secure NADs that possess authorizing credentials that allow them to issue restricted commands and access encrypted messages and log files in the same fashion as a Data Center. These devices are intended to always be in the possession and complete control of a trusted agent and as such are most likely to be portable (handheld) NADs (HNADs).

Non-secure NADs support the following tasks:

Identify Security Devices in their RF communication range,

Establish a wireless network connection with the Security Devices,

Deliver Security Device Commands to the Security Device,

Acquire Security Device Status Messages and Security Device Event Logs, and

Communicate Security Device Status Messages and Security Device Event Logs to the assigned DC.

Fully functional Secure NADs are usually portable (HNADs) having the following functional requirements:

Secure communications with a DC

Ability to authenticate to DC for download of encryption keys

Cargo Operator Interface for issuing Restricted or Unrestricted Commands

Communications with an ACSD/CSD/ECoC or MATTS Device

Data Center (DC)

DCs receive Security Device Data forwarded by NADs. Restricted Commands and Secure Data are protected from unauthorized access, modification, or spoofing by the use of encryption. The DCs have the ability to decrypt the Secure Data from Security Devices, to generate Restricted Commands, and to transfer Encryption Keys, Security Device Event Logs, and Status Messages from the Secure Reader, as needed. The protocols supporting the management of these encryption keys are part of this disclosure. DCs may exist at Government Agencies, CSI ports, the POA and/or the National Targeting Center (NTC) for information routing.

Electronic Chain of Custody (ECoC) Device

The ECOC device is a battery-powered mechanical locking device that has a minimum of two wireless communications modes one of which provides connectivity in the 2.4 GHz ISM-band and the other cellular. The ECOC may incorporate additional communications modes including on-chip satellite communications so long as these additional modes do not interfere with the primary RF and secondary cellular modes. The ECOC is designed to be mounted external to the door(s) of a cargo container, incorporate GPS functions and provide an interactive display for the user to view the lock status.

Network

Figure 3:
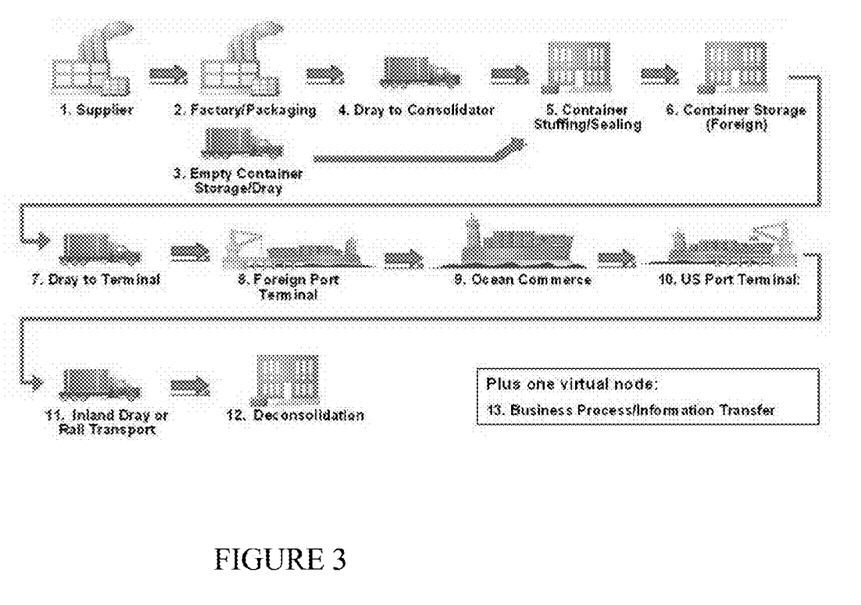
FIG. 3 shows a conceptual model of cargo container movement through a typical supply chain.

The ACSD Network, as defined and supported by these ACSD Network and Security Protocols addressed by this disclosure, was designed in order to create a way to monitor and track containers. FIG. 3 shows a basic conceptual model of movement of an ISO container through generic phases of intermodal transport. The typical movement sequences as shown in FIG. 3 include 1) supplier; 2) factory/packaging; 3) empty container storage/dray; 4) dray to consolidator; 5) container stuffing/sealing; 6) container storage (foreign); 7) dray to terminal; 8) foreign port terminal; 9) ocean commerce; 10) US port terminal; 11) inland dray or rail transport; 12) deconsolidation; and 13) business process/information transfer.

The main goal of the ACSD Network and Security Protocols is to have the Security Device conduct network discovery and communicate with an assigned DC through each NAD the ACSD comes into contact with. The Security Device provides Security Device Data to the NAD in a format uniquely described by the network protocols, which then relays this information to an assigned DC in a secure fashion as proscribed by the network protocols. The Security Device also accepts Security Device Commands from the NADs. Security Device Commands are provided to the NAD from either a DC or the operator interface to an HNAD.

Figure 4:
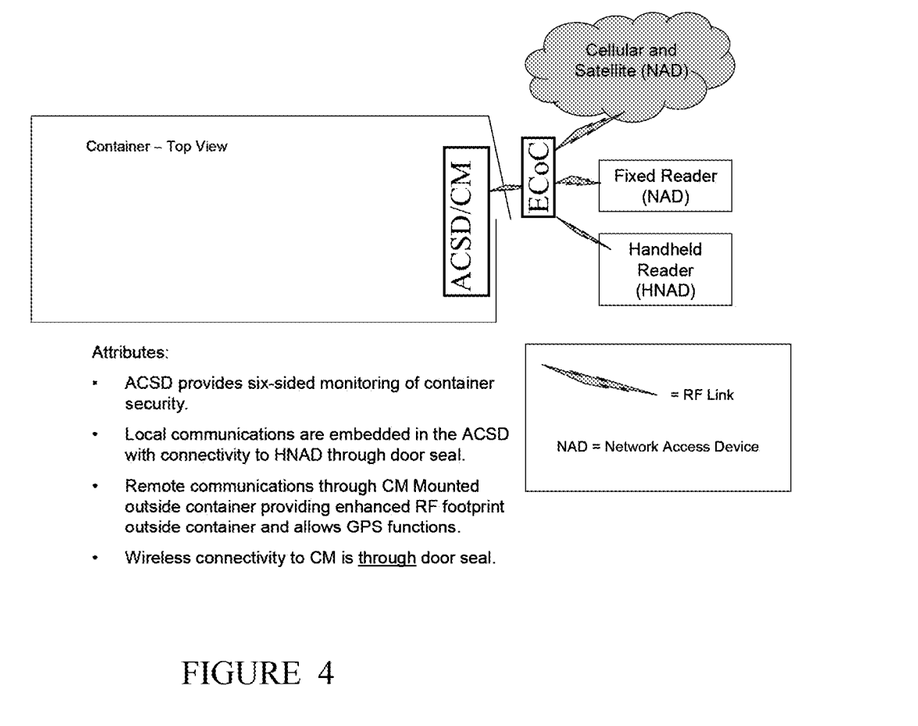
FIG. 4 shows a connection between an ACSD (Advanced Container Security Device) and a NAD (Network Access Device).

FIG. 4 shows a diagram of how the ACSD (or any other compliant sensor) connects to a NAD. In FIG. 4, the top view of a container is shown with an ACSD/CM contained within the container. The ACSD/CM provides communications via an RF link with a cellular and satellite NAD, fixed reader NAD, and handheld reader NAD.

Attributes of the connection shown in FIG. 4 are that the ACSD provides six-sided monitoring of container security; local communications are embedded in the ACSD with connectivity to HNAD through the door seal; remote communications through the CM mounted outside the container provides enhanced RF footprint outside the container and allows GPS functions; and wireless connectivity to the CM is through the door seal.

Narrative of Protocols Unique to ACSD Network

After the NAD establishes a connection with the Security Device, the Security Device shall send a "presence announcement" as an Unsolicited Device Status message. This message is restricted and is sent at the impetus of the on-container device. This unsolicited message is sent when communications connectivity exists and any of the following conditions exist:

An alarm, event or error condition exists and has not been sent with receipt-acknowledgement The last Unsolicited Device Status or requested status was sent more than a nominal 10 minutes in the past and the device was not in Handheld Reader coverage during this time period.

The last status message sent was not acknowledged by the DC

The selected NAD changed since the last status message was sent

Figure 5:
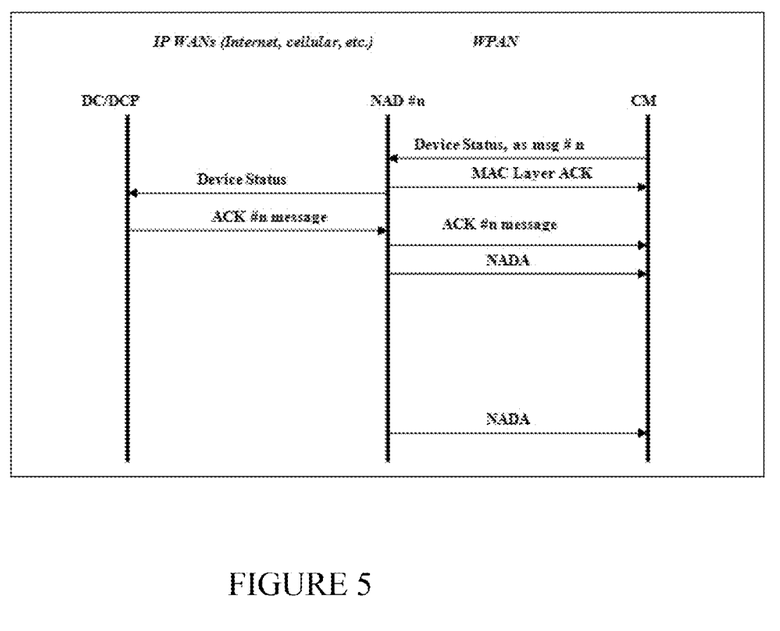
FIG. 5 shows a ladder diagram for ACSD Network Discovery Process.

Once the Unsolicited Device Status message is received by the NAD, the NAD will then forward the message to the DC via an IP link. The Data Center will send an acknowledgement message back to the ACSD in return. FIG. 5 shows a command ladder for the sending of an Unsolicited Device Status Message.

The Data Center is also able to request an Event Log message from an ACSD. Event Log Messages contain event records, each created due to either:

Changes in the device status as a result of a received command.

Changes in the device status that are not a result of a received command.

Sensor alarm state changes

Operating error condition

Figure 6:
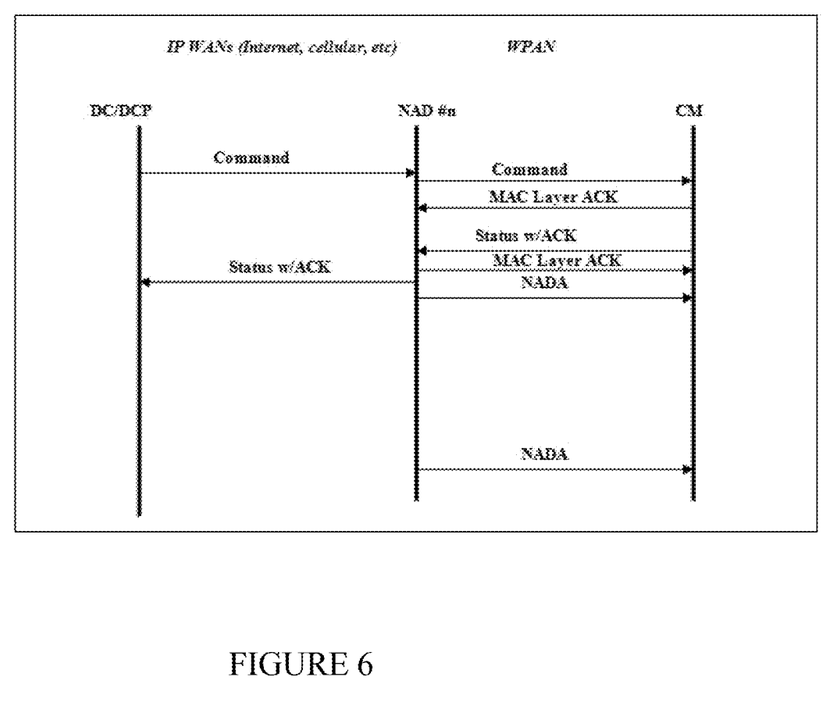
FIG. 6 shows an event log message ladder diagram.

FIG. 6 shows a ladder diagram for an Event Log Message command.

The Data Center is also be capable of encrypting and decrypting messages from the Security Device as well as initiating encryption key changes over the wireless link. The manner of encryption and key management is closely tied to the methods of network discovery, data format and messaging protocols of the ACSD Network.

The ACSD Network and Security Protocols (discovery, data formats and messaging procedures) are unique in that they provide a wholly agnostic network extension to the internet providing full access to vendors who intend to support the DHS concept of cargo security. As such these protocols are based on the assumption of an un-trusted network with Communications Security (ComSec) features functionally enabled through dependence on application layer encryption and a unique encryption key management system uniquely suited for global applications.

The described can be used in conjunctions with the networking requirements of the ACSD, CSD, ECOC and MATTS technologies. In addition, future references to the Munitions Security Device and Weapons Tracking Seal technologies are also related. Any network constructs that reference one or more of these efforts are intended to be subject to the described network protocols.

From the above description, it is apparent that various techniques may be used for implementing the concepts of the present invention without departing from its scope. The described embodiments are to be considered in all respects as illustrative and not restrictive. It should also be understood that the present invention is not limited to the particular embodiments described herein, but is capable of many embodiments without departing from the scope of the claims.

What is claimed is:

1. A method of providing secure wireless-to-IP communication, in a system including a set of air interface protocols (AIPs), between conveyance-mounted security sensors and one or more remote data consolidation centers employing a global ad-hoc network topology, the method comprising:
    providing one or more on-conveyance sensing devices;
    providing one or more on-conveyance wireless communications devices;
    providing one or more wireless-to-IP bridging devices providing one or more internet-addressable remote data centers;
    wherein each remote data center contains computer instructions for:
        commanding secure AIP-compliant operations;
        maintaining a data base of security sensor-related events interfacing to an embedded or external encryption key management facility,
    wherein the AIP enables a distributed battery-powered sensor network to:
        conduct passive network discovery;
        passively check for waiting data;
        conduct RF spectrum scan for optimal battery conservation;
        employ a network access device announcement message based on the IEEE Standard 802.15.4 data frame to maximize payload size;
        enable use of CSMA/CA for transmission medium access;
        enable end-to-end encryption between distributed sensor network and remote data center(s) independent of transport layers;
        employ variable network access device announcement intervals for optimizing battery conservation strategy of distributed sensor network; the set of AIPs further comprising:
        a connectionless wireless secure wireless network that eliminates all network management messaging and requires no device association and which allows for;
        connectionless message exchange wherein computing capability and resources of the end devices are highest among all devices comprising the connectionless network;
        connectionless message exchange from end devices whose addresses are unknown by network access device in advance;
        connectionless message exchange supporting network discovery and status message exchange requirements for end-devices randomly moving in and out of network access device coverage;
        connectionless message exchange implementing a set of reduced MAC-layer messaging protocols to minimize RF channel traffic and coexistence with commercial standard 802.11 systems;
        connectionless message exchange while adhering to a tag talks last guidelines for international commercial shipping environments.

2. The method of claim 1, further comprising a set of protocols for data encryption to allow transport over untrusted networks.

3. The method of claim 1, wherein the encryption key management facility is conducted over a wireless medium.

4. The method of claim 1 wherein the encryption rekeying process is secure.

5. The method of claim 1, wherein the security sensor-related events are battery-powered.

6. The method of claim 1, wherein the remote data center manages the distributed sensor network by:
    forwarding a first identity code from the network access device announcement message to the sensor;
    receiving a matching identity code corresponding to the first identity code from the sensor; and
    forwarding a waiting message via a network access device to the sensor.

7. The method of claim 1, wherein the remote data center forwards messages from network access devices with different levels of encryption to distributed sensors with matching encryption.

8. The method of claim 1, wherein the distributed sensors conduct power management by going into a power conservation state based on next-time-of-transmission information from a received network access device announcement.

9. The method of claim 1, wherein the sensor in the distributed network is in wireless communication with another sensor.

10. The method of claim 1, wherein the sensor in the distributed network is in wireless communication with a remote data center.

11. The method of claim 1, wherein the remote data center is hosted in a network cloud.

12. In a system including set of air interface protocols (AIPs) providing secure wireless-to-IP communication between conveyance-mounted security sensors and one or more remote data consolidation centers employing a global ad-hoc network topology, the system comprising:
- one or more on-conveyance sensing devices;
- one or more on-conveyance wireless communications devices;
- one or more wireless-to-IP bridging devices one or more internet-addressable remote data centers;
- wherein the remote data center contains computer instructions for:
  - commanding secure AIP-compliant operations;
  - maintaining a data base of security sensor-related events interfacing to an encryption key management facility;
  - conducting passive network discovery; and
  - passively checking for waiting data,
- wherein the AIP enables a distributed battery-powered sensor network to:
  - conduct passive network discovery;
  - passively check for waiting data;
  - conduct RF spectrum scan for optimal battery conservation;
  - employ a network access device announcement message based on the IEEE Standard 802.15.4 data frame to maximize payload size;
  - enable use of CSMA/CA for transmission medium access;
  - enable end-to-end encryption between distributed sensor network and remote data center(s) independent of transport layers;
  - employ variable network access device announcement intervals for optimizing battery conservation strategy of distributed sensor network; the set of AIPs further comprising:
- a connectionless wireless secure wireless network that eliminates all network management messaging and requires no device association and which allows for;
- connectionless message exchange wherein computing capability and resources of the end devices are highest among all devices comprising the connectionless network;
- connectionless message exchange from end devices whose addresses are unknown by network access device in advance;
- connectionless message exchange supporting network discovery and status message exchange requirements for end-devices randomly moving in and out of network access device coverage;
- connectionless message exchange implementing a set of reduced MAC-layer messaging protocols to minimize RF channel traffic and coexistence with commercial standard 802.11 systems;
- connectionless message exchange while adhering to a tag talks last guidelines for international commercial shipping environments.

\* \* \* \* \*